No. 853,519. PATENTED MAY 14, 1907.
T. PERKS.
WARP STOP MECHANISM.
APPLICATION FILED NOV. 22, 1905.
9 SHEETS—SHEET 3.
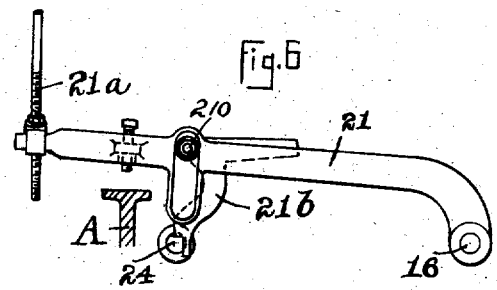
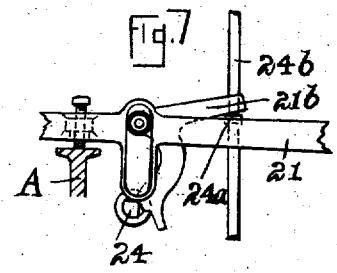
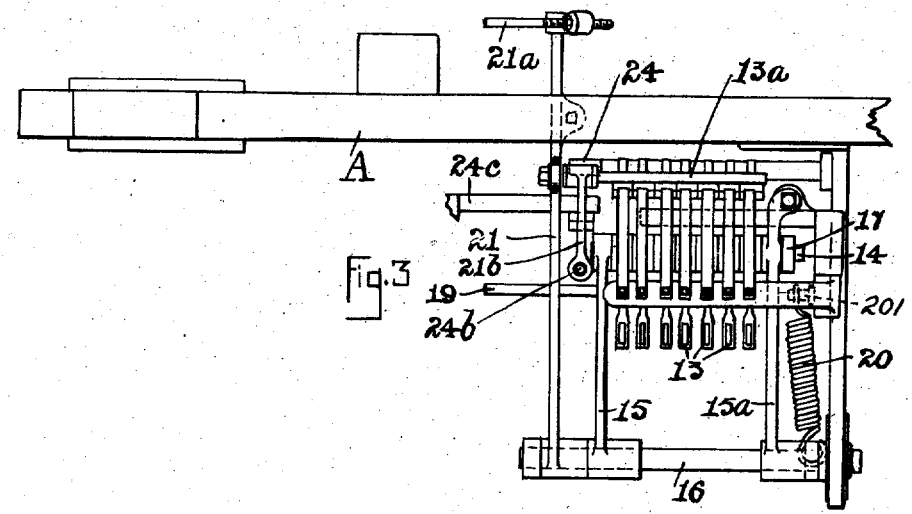

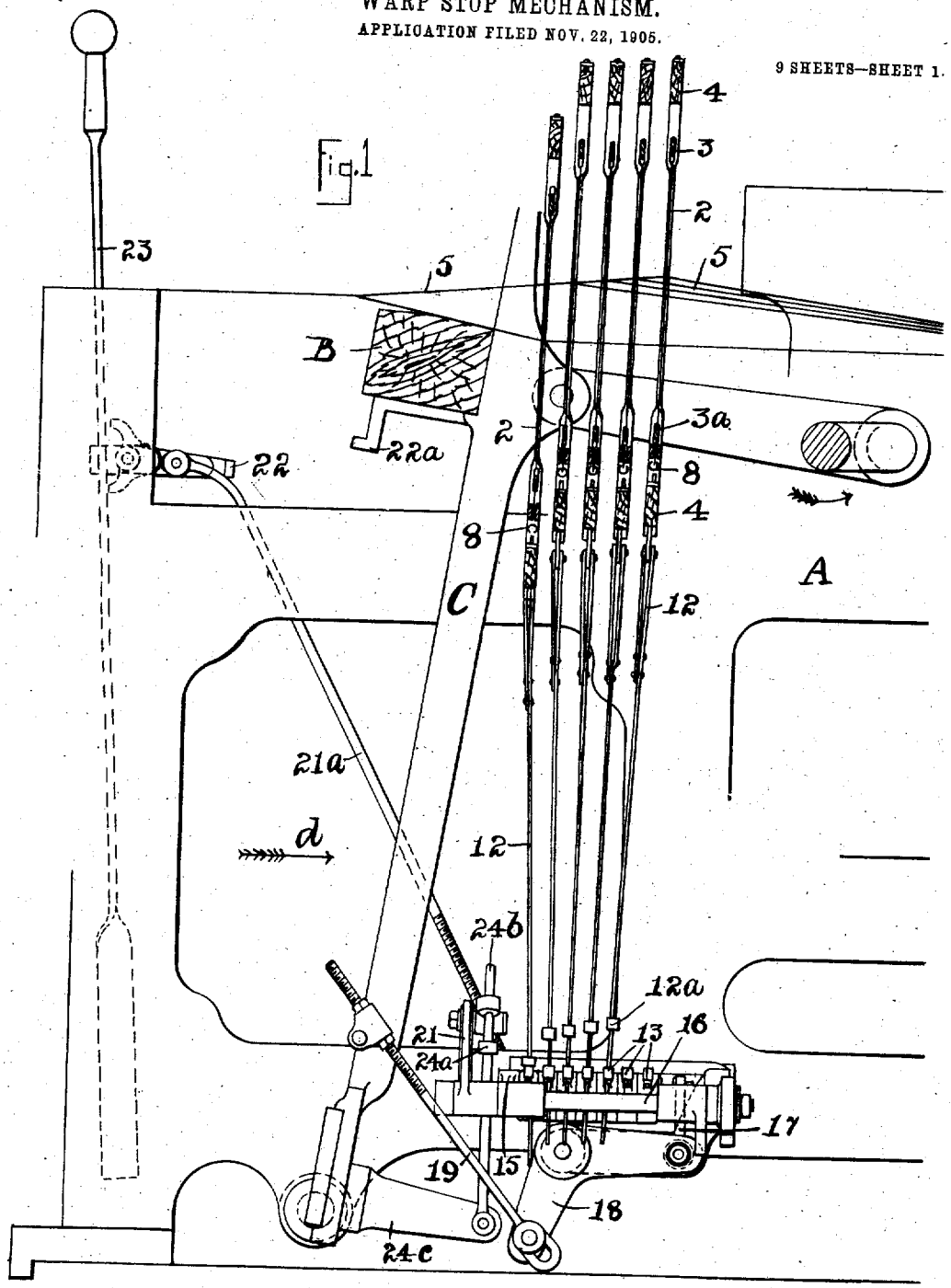

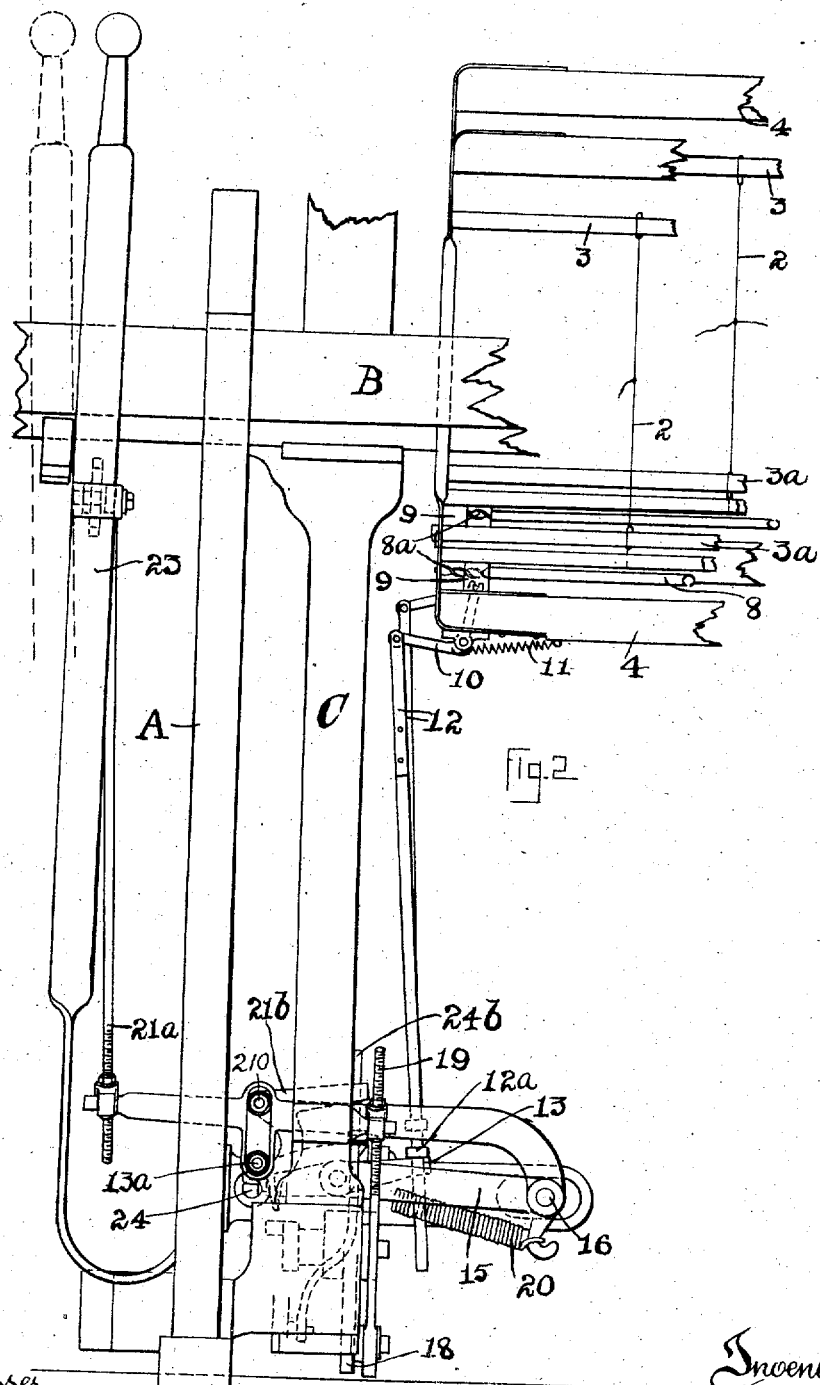

No. 853,519. PATENTED MAY 14, 1907.
T. PERKS.
WARP STOP MECHANISM.
APPLICATION FILED NOV. 22, 1905.
9 SHEETS—SHEET 4.
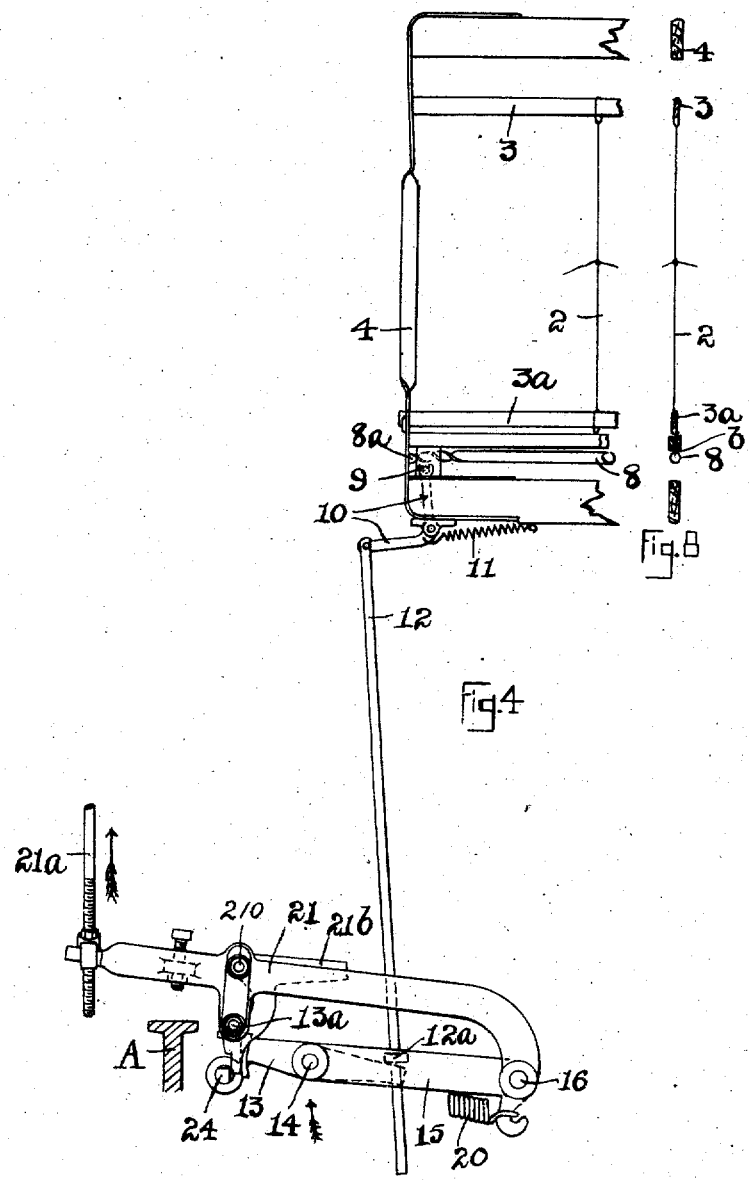

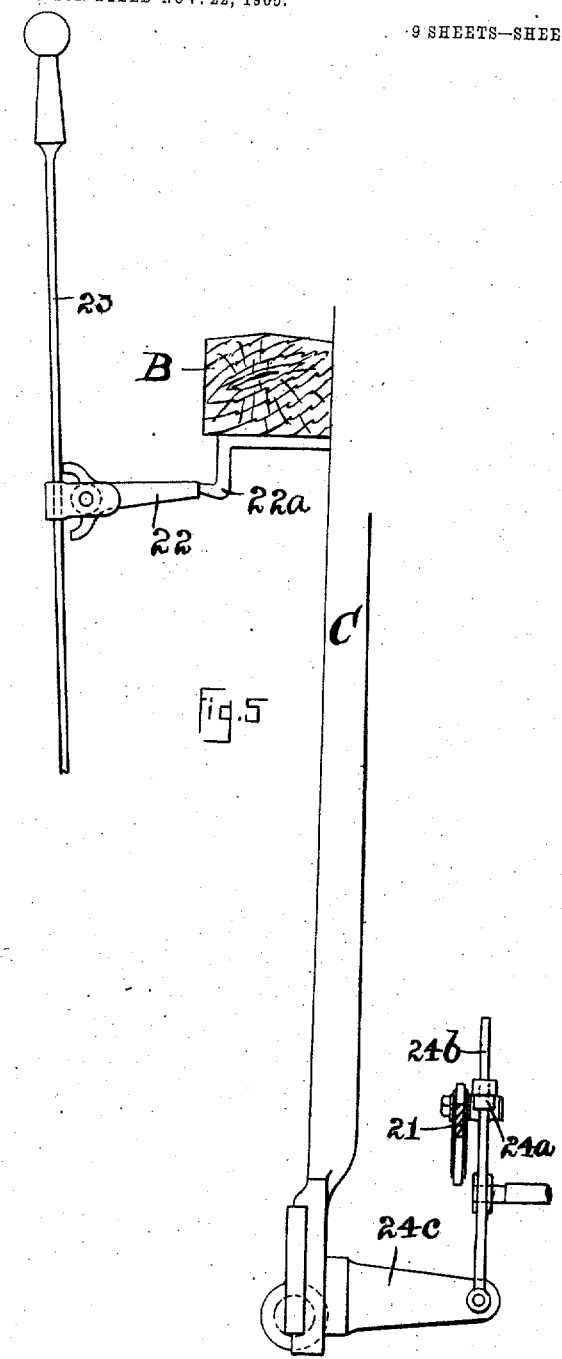

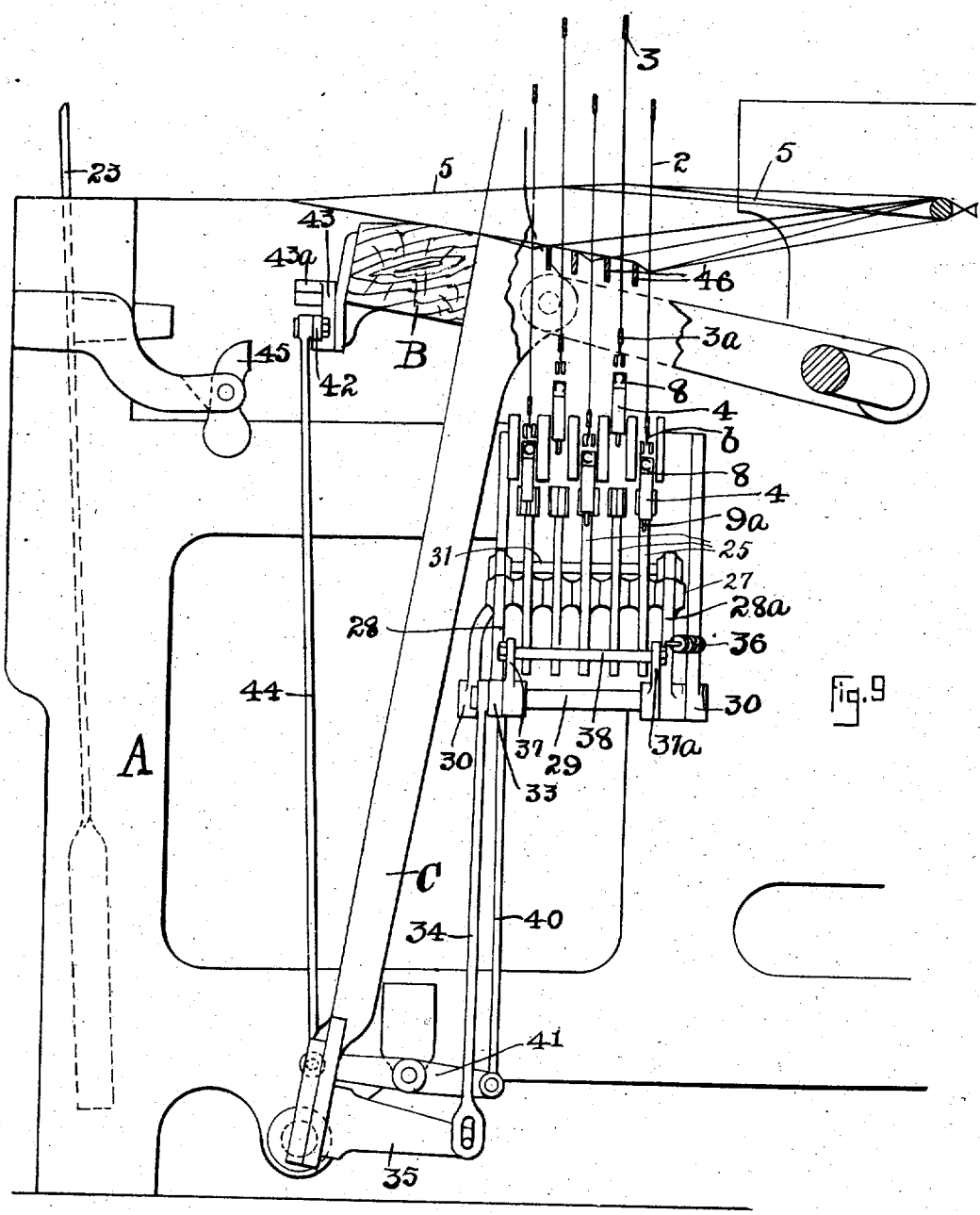

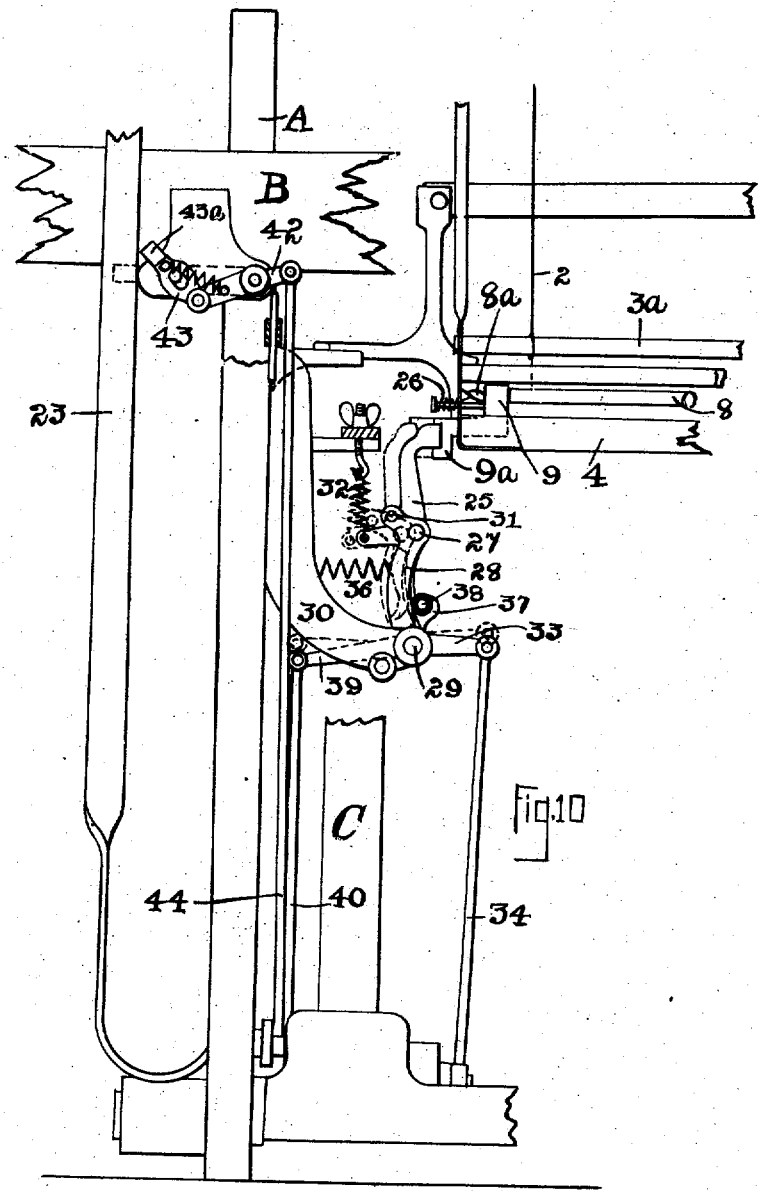

No. 853,519. PATENTED MAY 14, 1907.
T. PERKS.
WARP STOP MECHANISM.
APPLICATION FILED NOV. 22, 1905.
9 SHEETS—SHEET 8.
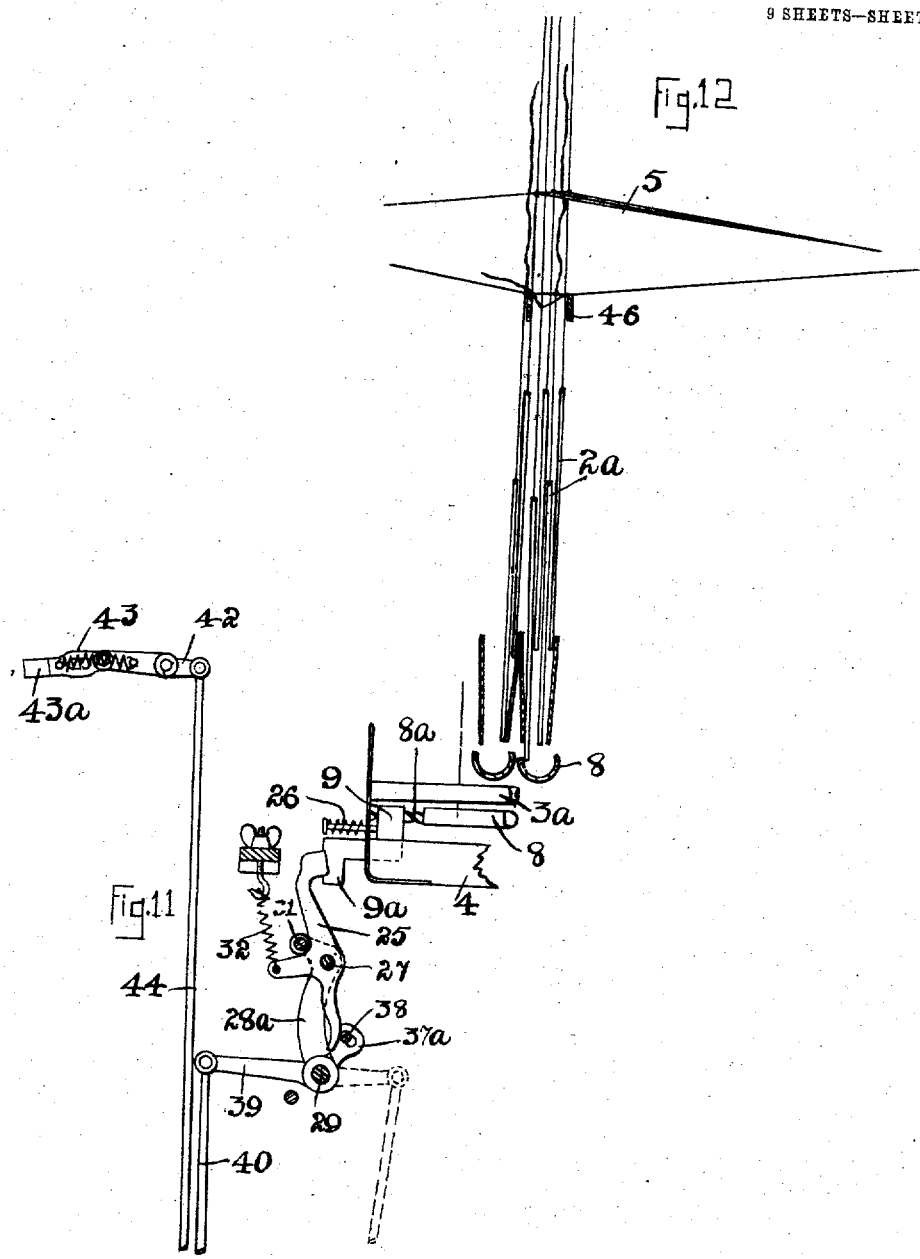

No. 853,519. PATENTED MAY 14, 1907.
T. PERKS.
WARP STOP MECHANISM.
APPLICATION FILED NOV. 22, 1905.
9 SHEETS—SHEET 9.
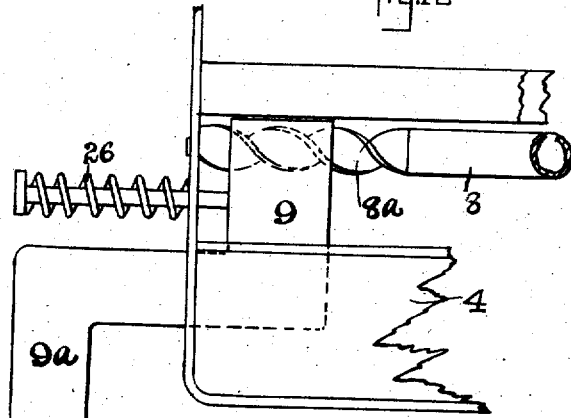
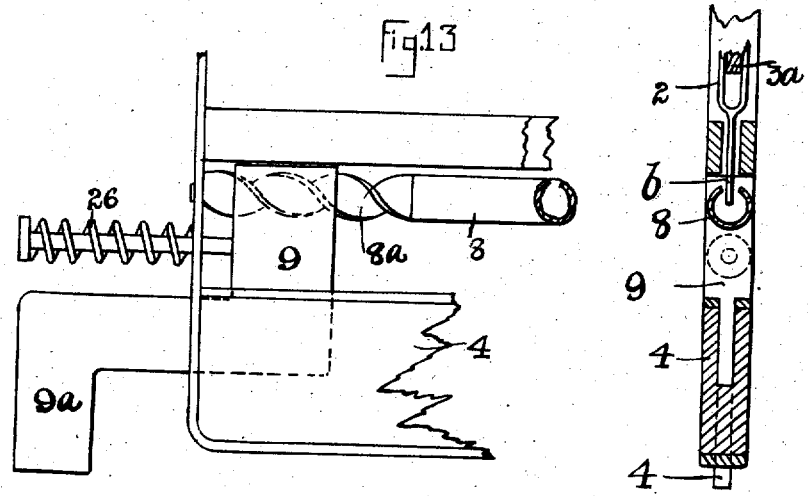
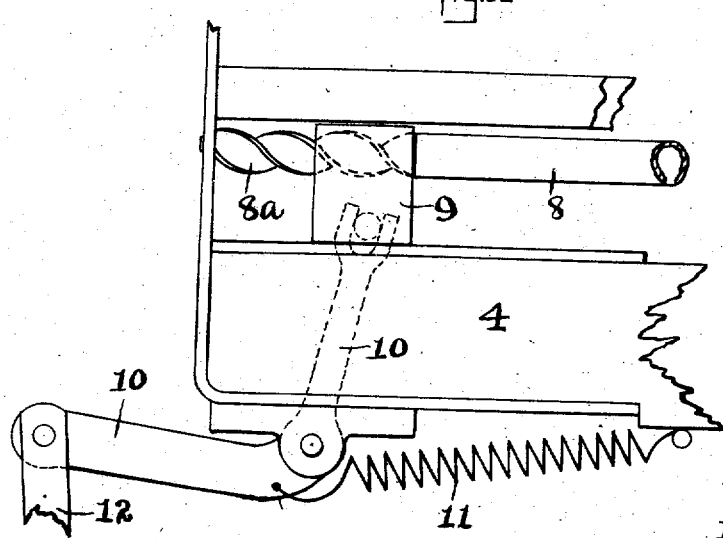
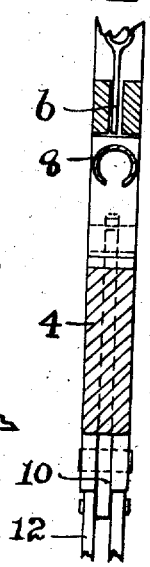
Witnesses
WM Mattison
E Batchelder
Inventor
Thomas Perks
by Wright Brown Quinby May
Attorneys

UNITED STATES PATENT OFFICE.

THOMAS PERKS, OF KEIGHLEY, ENGLAND, ASSIGNOR TO GEORGE HATTERSLEY AND SONS LIMITED, OF KEIGHLEY, ENGLAND.

WARP STOP MECHANISM.

No. 853,519.     Specification of Letters Patent.     Patented May 14, 1907.

Application filed November 22, 1905. Serial No. 288,509.

*To all whom it may concern:*

Be it known that I, THOMAS PERKS, a subject of the King of Great Britain, and a resident of 38 Hainworth Lane, Keighley, in the county of York, England, have invented certain new and useful Improvements in Warp Stop Mechanism, of which the following description, together with the accompanying sheets of drawings, is a specification.

In the production of stop-motion mechanism that has to be brought into use on the breakage or failing of any of the warp threads in a loom, one of the most essential features of such mechanism is that the power or force exerted by or through any single or individual thread of warp, little though it is or may be, should at all times be sufficient to keep all the mechanisms of said loom in perfect order during the weaving operations. Another desirable feature of said mechanism is that the failing of this slight power of any individual thread should afford ample variation from the normal working conditions of the whole loom to bring about an entire stoppage of its functions without putting an excessive strain upon any of even its most delicate parts thus enabling those comparatively light and fragile devices operated by each of said individual warp threads to perform all the functions desired of them and withal to withstand the wear and tear of the incessant weaving operations of the loom. It is also desirable in producing the devices referred to, that the application of complicated parts which add to the care and attention of the weaver should be entirely avoided.

With these features and objects in view the mechanism hereinafter described has been devised and same has been arranged to act or operate in conjunction with that class of detector mechanism in which the heddles or healds are made to indicate or detect broken or failing warp threads because in this class said warp threads have no more parts to pass or be threaded through than they have in an ordinary loom having no warp-stop mechanism however in accordance with this invention said devices are so arranged and constructed that it is possible to use in conjunction with them heddles or healds of such light construction as will not in anyway put any extra strain on the threads of warp yet said heddles, although light, are not damaged, strained or caused to rapidly deteriorate by being used to control the actions of the parts employed.

In carrying this invention into effect use is made of the devices hereinafter explained and as illustrated in the accompanying sheets of drawings wherein:—

Figure 1 is a sectional end elevation of a sufficient part of a loom to illustrate the application thereto of the improved parts. Fig. 2 is a front elevation of certain of the parts shown by Fig. 1. Fig. 3 is a view of certain of the operating parts as seen from above. Fig. 4 is a sectional front elevation showing the positions of the parts changed as compared with their positions shown by Fig. 2. Fig. 5 is an end elevation illustrating in detail certain of the parts shown by Fig. 1. Figs. 6 and 7 are front elevations illustrating in detail certain of the parts shown by Figs. 2 and 4 in altered positions. Fig. 8 is an end elevation of a heald shaft with the end parts omitted. Fig. 9 is a similar view to Fig. 1 but illustrates a modification in the arrangement of certain of the parts as hereinafter described. Fig. 10 is a similar view to Fig. 2 but illustrates the parts shown by Fig. 9. Fig. 11 is a drawing showing certain of the parts illustrated by Fig. 10 but in altered positions. Fig. 12 is an end elevation of the device shown as being arranged to operate in conjuction with the lingoes of a jacquard machine. Figs. 13, 14, 15 and 16 are views drawn to an enlarged scale and show certain parts of the devices in detail as hereinafter explained.

Similar letters and figures of reference indicate similar parts throughout the several views.

A indicates the end frame of the loom, B the slay-board or batten and C the lay sword.

As hereinbefore stated, to attain the object of this invention use is made of healds or heddles 2 either of metal as shown in all the drawings except Fig. 12 or of cotton or other fibrous material from which are suspended metallic pieces 2ª as shown by said Fig. 12. These heddles 2 are mounted upon their shafts or cross bars 3 and 3ª which are carried by being fixed in the framework 4 in the well known manner, so that the forces, to be exerted by or through these heddles 2 to pull or bring their respective warp threads 5 (when these latter are intact) down to their lowest positions for forming the shed or opening for the passage of the shuttle, will be sufficient to keep their lower ends $b$ in a position above and clear of a vibrating or oscillating bar 8 beneath, while when any of said warp threads 5 breaks or fails, its operating heddle 2 will descend by gravity to allow its lower end $b$ to fall into the path of motion of said bar 8 (as shown by Fig. 14) all of which functions are already well known and understood. The bar 8 is of a hollow cylindrical form and has a longitudinal slot formed or cut into it to receive the ends $b$ when these latter descend as stated. One of the essential features of this invention is the production of means for transmitting oscillatory motion to this bar 8, such a character that the comparatively weak or slender extremity $b$ of the heddles 2 shall exercise relatively great power over said means which operate the bar 8 so that the functions performed by these extremities $b$ do not subject them to any damaging strains or deteriorating actions.

The devices employed for operating the bars 8 consist of the sliding piece 9 which has spiral grooves formed in it to receive the spiral ridges $8^a$ on the bar 8 so that as said piece 9 is slid backward and forward over the spiral ridges $8^a$ an oscillatory motion will be transmitted to the rod 8. As shown by Figs. 1 to 9 inclusive as also by Figs. 15 and 16 these pieces 9 are moved on the bars 8 by levers 10 and each of said levers being operated in one direction by rod 12 and in the other by the spring 11. The levers 10 derive their positive motion by rods 12 from lever 13 which are caused to rise by being mounted on the shaft 14 carried in the ends of the levers 15 and $15^a$. The levers 15 and $15^a$ are loosely pivoted upon the fixed shaft 16 so that by being coupled by the rod 17, lever 18 and rod 19 to the lay sword C, as this moves in the direction of the arrow $d$, they may be caused to rise while their descent is effected by gravity. The spring 20 is used for yieldingly counteracting some of the weight of the several parts referred to. One end of said spring is connected to a hook depending from the hub of lever $15^a$ (see Figs. 2 and 3) and the other end is engaged with a fixed pin 201 indicated by dotted lines in Fig. 3. Said pin and the end of the spring engaging it are omitted from Fig. 2 to avoid confusion with other parts. As the levers 15 and $15^a$ are thus caused to rise and fall they transmit a continuous rising and falling movement to the levers 13. When the healds are in their raised positions they carry their rods 12 with them so that the collars $12^a$ fixed on these rods are thus raised clear of the levers 13 at this time, however when the healds descend (in which position they are to act as detectors) then the collars $12^a$ fall upon or come into contact with their respective levers 13 so that should these latter be raised then the rods 12 are raised and the levers 10 are pressed forward as is the front lever 10 shown in Fig. 2. On the pressing of the lever 10 in this direction, provided none of the lower ends $b$ of the healds 2 have descended into the groove in the bar 8, the oscillating of said bar 8 is the only function performed but should such lower end $b$ of any heald 2 have descended by reason of its warp thread failing, then the bar 8 is held by it from rotating and so the lever 10 is held from advancing, thus by its rod 12 and collar $12^a$ it puts extra pressure on its lever 13 causing same to swivel or tilt on its shaft 14 bringing its opposite end into a raised position as shown by Fig. 4 in which position it has come into contact with the projecting pin $13^a$ fixed upon the lever 21 thus this rising of the opposite end of the lever 13 has the effect of raising the lever 21 and so also the lever 22 which is coupled to it by the rod $21^a$, by which means the arresting of the loom is effected by and when the bunter $22^a$, fixed to the slayboard B, comes into contact with said lever 22 (see Fig. 5) since this latter is mounted on the handle 23 which operates the belt shifter.

As the motion of the lever 21 is derived from the laysword C which oscillates with the slayboard B the rising of the lever 21 is out of time with the advancing of said slayboard B so that if the lever 21 was allowed to descend with the receding of the parts that had raised it, it could not effect any change in the position of the handle 23, however to accomplish this object a ratchet $21^b$ is pivoted at 210 upon the lever 21 and when this latter is raised said ratchet, rising with it, is moved to overhang the fixed stud 24 as shown by Fig. 4 which thus arrests same on its descent and said ratchet $21^b$ is allowed to remain in this position until after the slayboard has advanced to strike the lever 22 on the handle 23 immediately after which the ratchet $21^b$ is withdrawn from overhanging the stud 24 by means of the collar $24^a$ on the rod $24^b$ operated by the arm $24^c$ fixed to the lay sword C, acting upon its rear end as shown by Fig. 7.

Referring to Figs. 9, 10, 11 and 13, the pieces 9 may be moved in one direction by the levers 25 while they are retracted by the springs 26, in which case the levers 25 do not rise and fall with the healds but are mounted on the shaft 27 carried by the lever arms 28 and $28^a$ fixed upon the shaft 29 which is pivoted on the bearings 30. These levers 25 are normally held against the cross bar 31 by their springs 32 and said cross bar 31 as well as the shaft 27 are carried by the arms 28 and $28^a$, so that as these are oscillated about the center of the shaft 29 they are brought into contact with the extending ends $9^a$ of the pieces 9. Oscillatory motion is transmitted to the arms 28 and 28ª by the retracting spring 36, lever 33 rod 34 and projecting piece 35 secured to the lower end of the laysword C. On the shaft 29 are also mounted the arms 37 and 37ª carrying the cross bar 38, and on the hub of the arm 37 another arm 39 is secured so that by a rod 40, connected to it and to a lever 41 this latter may be moved to operate the levers 42 and 43 by means of the rod 44, said levers 42 and 43 being mounted upon so as to be carried by the lay B. The actions of these parts are as follows:— As the levers 25 are moved forward to press upon the ends 9ª of the pieces 9 during the time that the healds remain in their lowest positions, provided all the warp threads are intact and consequently all their respective healds are held with their ends $b$ clear of the bars 8, these latter will be thereby merely partly rotated about their axes and the motions of all the parts are allowed to proceed, however should a thread fall or be broken so as to allow its heald to fall to carry its end $b$ into the groove of the bar 8 then as its respective lever 25 moves forward to press upon the piece 9 this latter can only rotate the bar 8 as far as the end $b$ within its groove will allow it consequently its further movement forward is arrested as is also that of the upper end of its lever 25, but since the central part of such lever 25 will still be carried forward by its shaft 27 continuing its movement the lower end of said lever 25 will be caused to rapidly advance and so it will press upon the bar 38 causing same to move the levers 37, 37ª, lever 39, rod 40, lever 41, rod 44, and levers 42, 43 bringing these latter from their positions shown by Fig. 10 into the position shown by Fig. 11 in which latter position the end 43ª of the lever 43 is brought into contact with the belt shifting handle 23 and so arrests the motion of the loom. The advancing of the lay B to bring the lever 43 to disengage the handle 23, carries the lever 43 over the latch 45 which will when pressed in this direction turn freely upon its pivotal pin, while on the receding of the lay B said lever 42 will again encounter the latch 45 but at such time and when pressed in this or opposite direction is rigidly held, hence the actions of its inclined surface on the lever 42 causes this latter to rise and thus will restore all the parts back to their normal operating positions.

In order to relieve the healds 2 from pressing too closely against each other and against the threads of warp passing them, cross bars 46 may be arranged to intervene between the healds 2 and extend across the loom beneath the warp thread 5, as shown in Figs. 9 and 12. The positions or height of these bars 46 are or is such as to allow the warp threads 5 to be freely brought against the upper surface of the slayboard B but to arrest their descent further except where drawn by the heald between or adjoining them thus each series of healds 2 between any two bars 46 may bring their warp threads down between said two bars while the same warp threads will extend straight across and in line with the upper edges of all the other bars 46 in this manner the eye parts of the healds 2 are brought down and separated from the large mass of warp threads and are consequently allowed more freedom to fall should any of their respective supporting threads have failed. To effect the lowering of the metallic pieces 2ª (see Fig. 12) when these are used in connection with the healds operated by a jacquard machine, the cross bars 46 are again employed but in such case they arrest the descent of the warp threads which by stretching across them support the parts beneath, however when such warp threads fail then the parts descend and so enter the slots in the rods 8 to bring about a stoppage of the loom as hereinbefore explained.

Such being the nature and object of my said invention, what I claim is:—

1. In warp stop mechanism for looms, detector heddles, oscillatory grooved bars for receiving the ends of said heddles, spirally grooved parts on said oscillatory bars, sliding pieces for moving over said spirally grooved parts on the bars to cause said bars to oscillate, means for operating said sliding pieces, and means whereby on the arresting of the motion of the bars, other parts are brought into position for the arresting of the loom's driving mechanism substantially as set forth.

2. In warp stop mechanism for looms, detector heddles, a member mounted to move about a center to contact with said heddles when the detector heddle falls on the breaking of a warp thread, said member having volute or spiral ridges formed upon it, means for operating said member by acting through or by said volute ridges and means whereby the force acting through or against said volute ridges may be on being rebutted, utilized for arresting the motion of a loom substantially as herein specified.

3. In warp stop mechanism for looms, detector heddles, an oscillatory member mounted to contact with said heddles when the detector heddle falls on the breaking of a warp thread, a sliding piece having volute or spirally formed surfaces arranged to transmit motion to said oscillatory member means for transmitting motion to said sliding piece, and means for arresting the motion of the loom when said sliding piece is held from traversing the full length of its path substantially as set forth.

4. In warp stop mechanism for looms, detector heddles means for arresting the threads of warp carried by said detector heddles on arriving at a certain part of their paths of motion so that each set of heddles is moved clear of the warp threads carried by the other heddles, a member mounted to contact with said heddles when the detector heddle falls on the breaking of a warp thread, means for operating said member and means whereby the inaction of said member brings about a stoppage of the loom substantially as herein specified.

5. In warp stop mechanism for looms, the combination with the loom harness having lingoes, of cross bars for arresting the descent of said lingoes when their respective warp threads are intact, a member for contacting with said lingoes when the detector heddle falls on the breaking of a warp thread, said member having a spiral or volute surface through which motion is transmitted to it, and means whereby on the arresting or preventing of the motion of such member, the motions of the loom are arrested substantially as herein specified.

6. In warp stop mechanism for looms, detector heddles means for arresting the threads of warp carried by said heddles, a member mounted to contact with said heddles said member deriving its motion through or by volute or spiral ridges, moving pieces for operating said members by pressing upon their spiral or volute ridges and means whereby the inaction of said moving pieces bring about a stoppage of the loom, substantially as herein specified.

7. In warp stop mechanism for looms, detector heddles, oscillatory grooved bars for receiving the ends of said heddles, levers for operating said bars, springs for retracting said levers, means whereby said levers are enabled to bring about a stoppage of the loom when said levers are held to overcome the force of their retracting springs and means whereby the several parts are readjusted in position after the stoppage of the loom has been effected substantially as herein specified.

THOMAS PERKS.

Witnesses:
  SAMUEL HEY,
  Y. LONGSTAFF.